(12) United States Patent
Shingyoji

(10) Patent No.: US 10,429,516 B2
(45) Date of Patent: Oct. 1, 2019

(54) POSITIONING CONTROL APPARATUS FOR SWITCHING WHETHER PREDICTIVE EPHEMERIS DATA IS USED FOR POSITIONING CALCULATION

(71) Applicant: CASIO COMPUTER CO., LTD., Tokyo (JP)

(72) Inventor: Ryuji Shingyoji, Tokyo (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 326 days.

(21) Appl. No.: 15/413,875

(22) Filed: Jan. 24, 2017

(65) Prior Publication Data

US 2017/0276796 A1 Sep. 28, 2017

(30) Foreign Application Priority Data

Mar. 23, 2016 (JP) ................................. 2016-058635

(51) Int. Cl.
*G01S 19/27* (2010.01)
(52) U.S. Cl.
CPC ..................... *G01S 19/27* (2013.01)
(58) Field of Classification Search
CPC ........ G01S 19/27; G01S 19/258; G01S 19/05; G01S 19/24; H04W 4/02
USPC ................................................... 342/357.66
See application file for complete search history.

(56) References Cited

U.S. PATENT DOCUMENTS

| 2010/0198512 A1* | 8/2010 | Zhang | G01C 21/26 701/530 |
| 2014/0285377 A1* | 9/2014 | Toda | G01S 19/27 342/357.74 |
| 2015/0070211 A1* | 3/2015 | Cheng | G01S 19/27 342/357.51 |
| 2015/0153458 A1* | 6/2015 | Syrjarinne | G01S 19/258 342/357.64 |

FOREIGN PATENT DOCUMENTS

JP 2013-195324 A 9/2013

\* cited by examiner

*Primary Examiner* — Harry K Liu
(74) *Attorney, Agent, or Firm* — Fitch, Even, Tabin & Flannery LLP

(57) ABSTRACT

A positioning control apparatus is provided, which includes: an acquisition unit that acquires predictive ephemeris data from outside of the positioning control apparatus; a setup unit that sets up, based on a predetermined condition different from an expiration date that has been set up in the predictive ephemeris data, a switching condition as to whether the predictive ephemeris data acquired by way of the acquisition unit should be used for positioning calculation to calculate location information that indicates a current location of the positioning control apparatus; and a control unit that switches, based on the switching condition that has been set up by way of the setup unit, whether the predictive ephemeris data should be used for the positioning calculation.

11 Claims, 5 Drawing Sheets

US 10,429,516 B2

POSITIONING CONTROL APPARATUS FOR SWITCHING WHETHER PREDICTIVE EPHEMERIS DATA IS USED FOR POSITIONING CALCULATION

CROSS-REFERENCE TO RELATED APPLICATION

This application claims the benefit of priority of Japanese Patent Application No. 2016-058635 filed on Mar. 23, 2016 the entire disclosure of which, including the description, claims, drawings, and abstract, is incorporated herein by reference in its entirety.

BACKGROUND OF THE INVENTION

Field of the Invention

The present invention relates to a positioning control apparatus for switching whether predictive ephemeris data is used for positioning calculation.

Related Art

Conventionally, in the technical field of location positioning by way of GPS (Global Positioning System), technologies for shortening a positioning time have been known. As one of the technologies for shortening the positioning time, ephemeris as GPS satellite orbit information is predicted over a long period, such long-term predicted ephemeris (hereinafter referred to as "predictive ephemeris") data is downloaded from a server on a network, and is used for positioning calculation, thereby allowing for short time positioning (hot start) over a long period of about one month (refer to Japanese Unexamined Patent Application, Publication No. 2013-195324).

SUMMARY OF THE INVENTION

The present invention provides a positioning control apparatus, which includes: an acquisition unit that acquires predictive ephemeris data from outside of the positioning control apparatus; a setup unit that sets up, based on a predetermined condition different from an expiration date that has been set up in the predictive ephemeris data, a switching condition as to whether the predictive ephemeris data acquired by way of the acquisition unit should be used for positioning calculation to calculate location information that indicates a current location of the positioning control apparatus; and a control unit that switches, based on the switching condition that has been set up by way of the setup unit, whether the predictive ephemeris data should be used for the positioning calculation.

DETAILED DESCRIPTION OF THE INVENTION

An embodiment of the present invention is described hereinafter with reference to the drawings.

Figure 1:
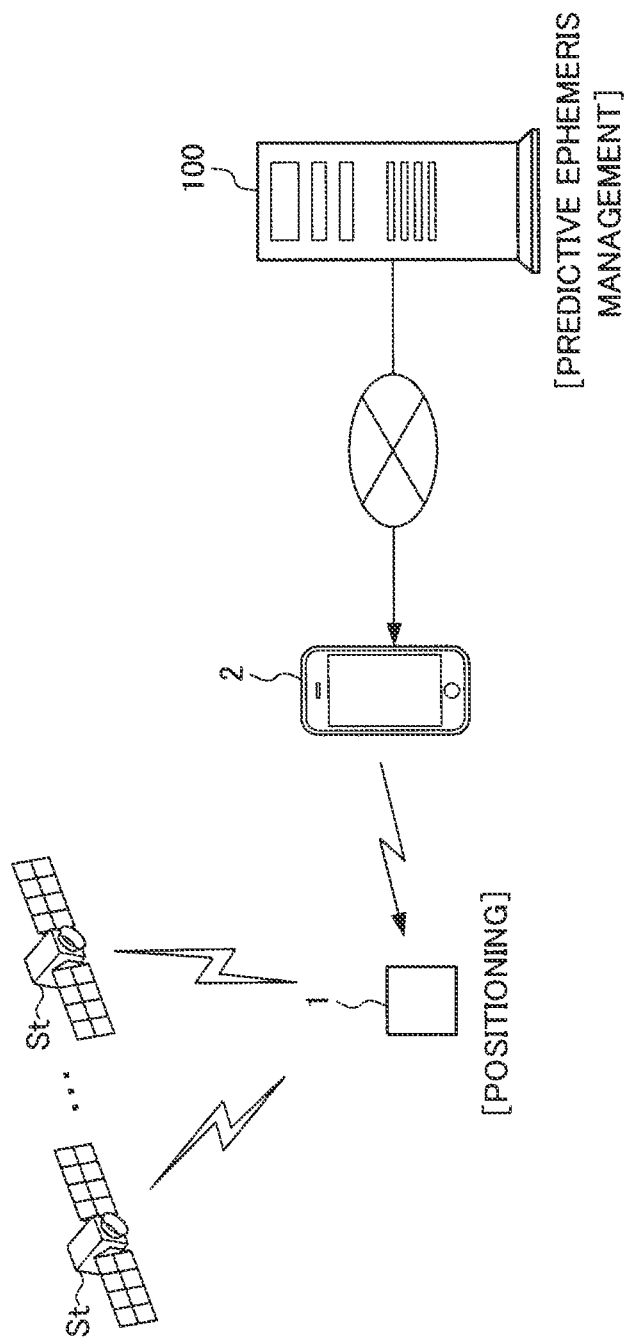
FIG. 1 is a schematic diagram illustrating GPS positioning with a logger apparatus 1 according to an embodiment of the present invention.

FIG. 1 is a schematic diagram illustrating GPS positioning with a logger apparatus 1 according to an embodiment of the present invention.

As illustrated in FIG. 1, the logger apparatus 1 receives GPS signals from a plurality of GPS satellites St, and performs positioning of a current location of the apparatus itself (hereinafter referred to as "GPS positioning"). When performing GPS positioning, the logger apparatus 1 uses predictive ephemeris data.

Predictive ephemeris data is managed in a predictive ephemeris server 100 that is an external server. When predictive ephemeris data is used on the logger apparatus 1, the predictive ephemeris data is temporarily downloaded to a mobile terminal 2 (in the present embodiment, a PC or smartphone), and then transferred to the logger apparatus 1 via USB or communication such as wireless LAN/Bluetooth (registered trademark). As a result, the logger apparatus 1 acquires the predictive ephemeris data. In the present embodiment, in the case in which communication is established (connected) between the logger apparatus 1 and the mobile terminal 2, the mobile terminal 2 acquires predictive ephemeris data from the predictive ephemeris server 100, and the logger apparatus 1 acquires the predictive ephemeris data from the mobile terminal 2.

Subsequently, the logger apparatus 1 performs GPS positioning by use of the predictive ephemeris data acquired from the predictive ephemeris server 100 via the mobile terminal 2.

Figure 2:
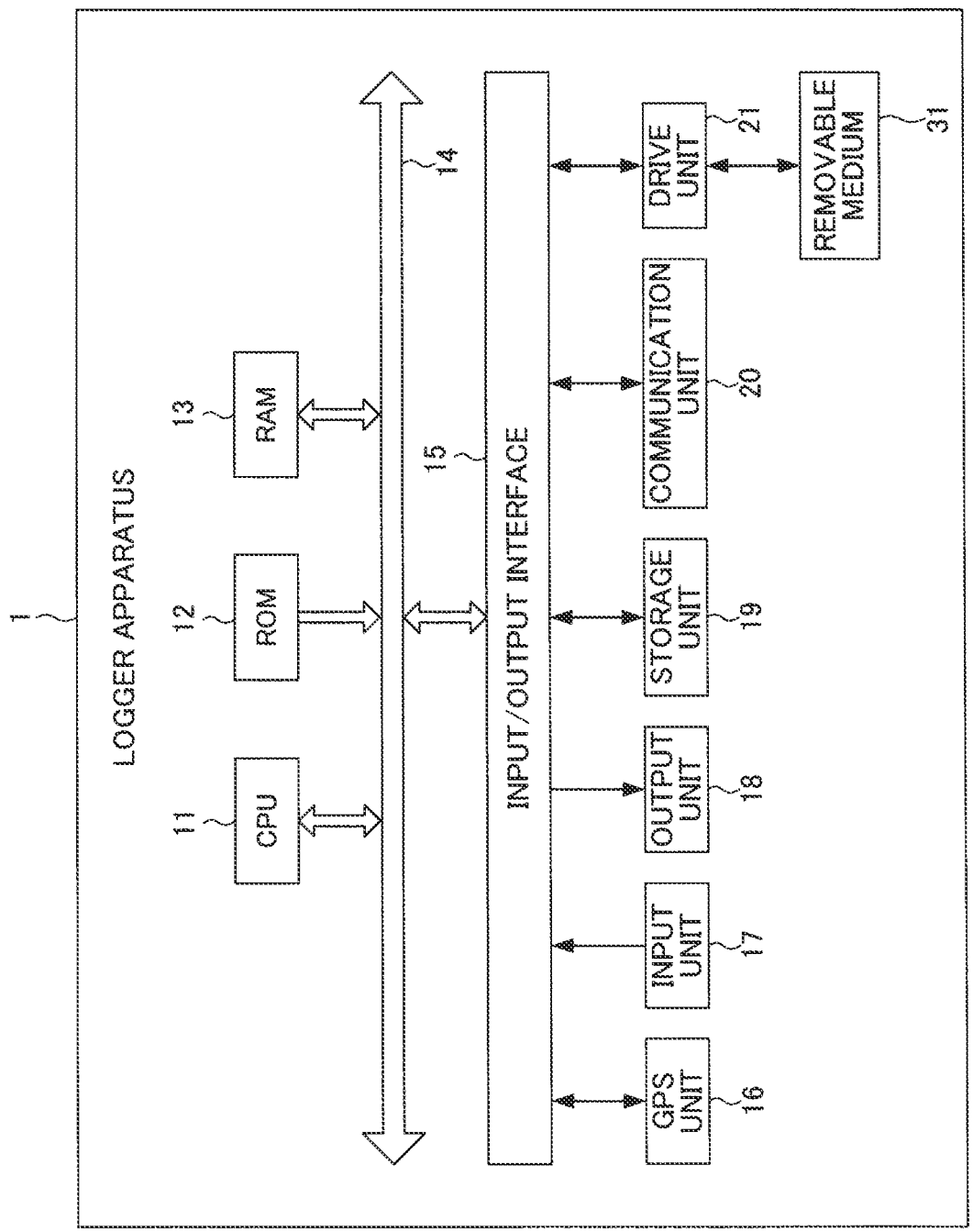
FIG. 2 is a block diagram illustrating a hardware configuration of the logger apparatus 1 according to an embodiment of the present invention.

FIG. 2 is a block diagram illustrating a hardware configuration of the logger apparatus 1 according to an embodiment of the present invention.

As illustrated in FIG. 2, the logger apparatus 1 includes a CPU (Central Processing Unit) 11, ROM (Read Only Memory) 12, RAM (Random Access Memory) 13, a bus 14, an input/output interface 15, a GPS unit 16, an input unit 17, an output unit 18, a storage unit 19, a communication unit 20, and a drive unit 21.

The CPU 11 executes various processing in accordance with programs recorded in the ROM 12, or programs loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The GPS unit 16, the input unit 17, the output unit 18, the storage unit 19, the communication unit 20, and the drive unit 21 are connected to the input/output interface 15.

The GPS unit 16 performs GPS positioning.

To describe in greater detail, the GPS unit 16 searches for GPS satellites to receive GPS signals (hereinafter referred to as "satellite search"), receives GPS signals by way of a GPS receiving antenna (not illustrated) from the plurality of GPS satellites searched by the satellite search, and calculates, based on the GPS signals received, information of latitude/ longitude and altitude (hereinafter referred to as "location information") indicating the current location of the device itself (hereinafter referred to as "positioning calculation").

The input unit 17 is configured with various buttons and the like, and inputs a variety of information in accordance with a user's instruction operations.

The output unit 18 is configured with a display unit, a speaker, etc., and outputs images and sound.

The storage unit 19 is configured with DRAM (Dynamic Random Access Memory) or the like, and stores data of various images or the like.

The communication unit 20 communicates with other devices (not illustrated) via a network including the Internet. In the present embodiment, the communication unit 20 communicates with the mobile terminal 2, and is controlled to acquire predictive ephemeris data.

A removable medium 31, which is composed of a magnetic disk, an optical disk, a magneto-optical disk, semiconductor memory or the like, is installed in the drive unit 21, as appropriate. Programs that are read via the drive unit 21 from the removable medium 31 are installed in the storage unit 19, as necessary. Further, the storage unit 19 also stores the predictive ephemeris data acquired. Similar to the storage unit 19, the removable medium 31 can also store a variety of data such as the image data stored in the storage unit 19.

When the GPS unit 16 performs GPS positioning, the logger apparatus 1 as thus constituted uses predictive ephemeris data for the satellite search and the positioning calculation.

Use of predictive ephemeris data provides the following advantages and disadvantages.

[Advantages]

1. An initial positioning time can be shortened for a long term.

In the absence of predictive ephemeris data, namely in the case in which actual ephemeris data is acquired, the positioning time is approximately 30 seconds at earliest (cold start); however, in the case in which predictive ephemeris data is used, the positioning time is several seconds at earliest (hot start).

2. If location accuracy is not required, acquisition of actual ephemeris data is no longer required, and the operating time is shortened, which in turn reduces the power consumption.

3. Instead of cold-start sensitivity, the sensitivity is equivalent to hot-start sensitivity.

[Disadvantages]

1. The location accuracy level is lower than that of actual ephemeris data received from GPS satellites.

The location accuracy level of actual ephemeris data is several to 10 m, whereas the location accuracy level of predictive ephemeris data is on the order of tens of meters.

2. The location accuracy level will decrease as days elapse after acquiring the predictive ephemeris data.

For example, the location accuracy level is tens of meters in about three (3) days, about 100 m in about fourteen (14) days, and about 500 m in about thirty (30) days, after acquiring the predictive ephemeris data. Note that the performance of predictive ephemeris data depends on the calculation technique and the algorithm used.

The logger apparatus 1 of the present embodiment has a function capable of performing GPS positioning without decreasing the positioning accuracy level, while continuing shortening the satellite search time, such that the above-mentioned advantages are maintained and disadvantages are resolved.

Figure 3:
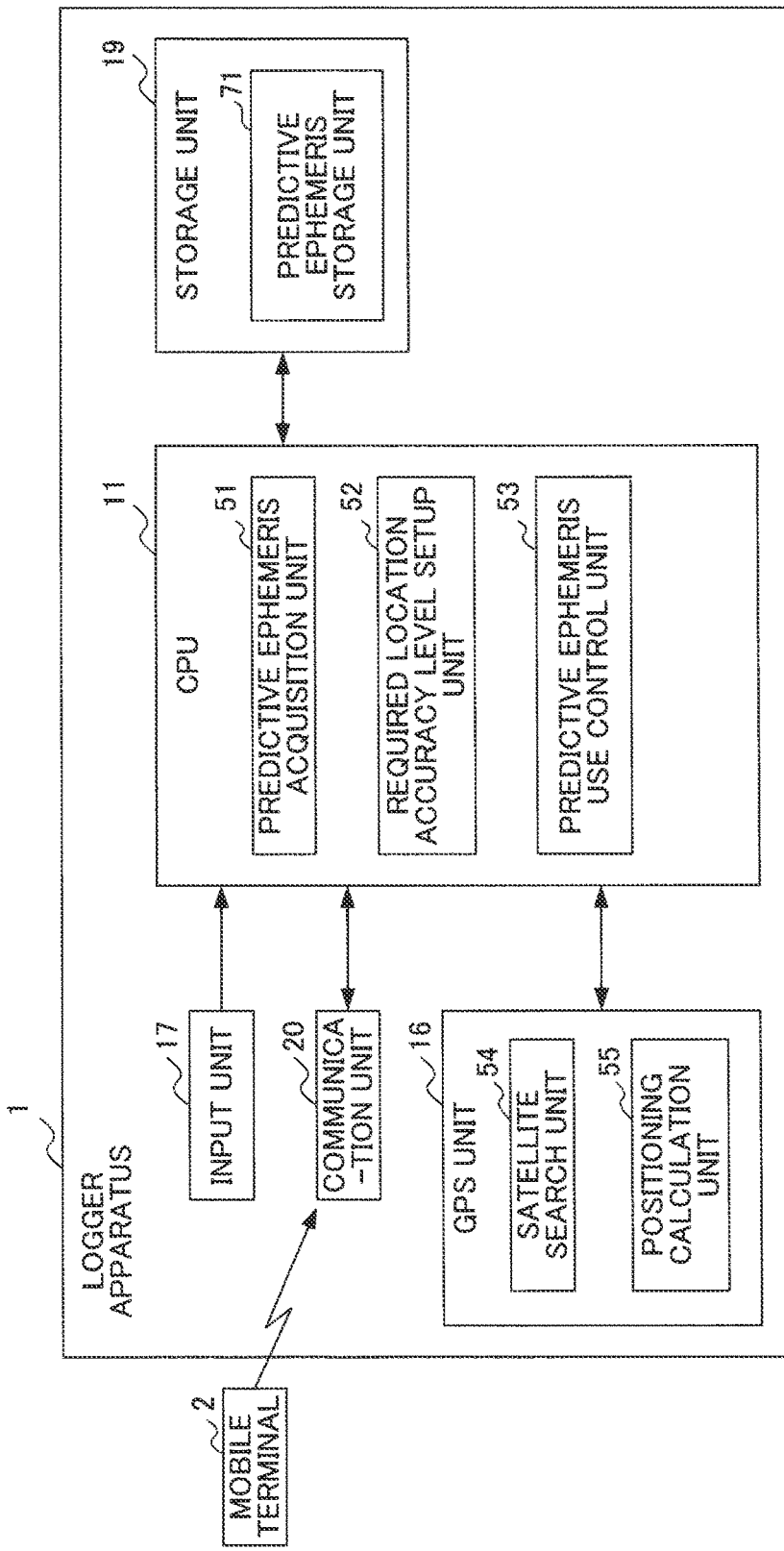
FIG. 3 is a functional block diagram illustrating a functional configuration for executing operational positioning processing, in relation to the functional configurations of the logger apparatus 1 of FIG. 2.

FIG. 3 is a functional block diagram illustrating a functional configuration for executing operational positioning processing, in relation to the functional configurations of the logger apparatus 1 of FIG. 2.

The operational positioning processing refers to a sequence of processing, in which predictive ephemeris data is constantly used for a satellite search, and the number of days of using predictive ephemeris data for positioning calculation is changed in accordance with the required location accuracy level (hereinafter referred to as "required location accuracy level").

As illustrated in FIG. 3, in the case in which the operational positioning processing is performed, a predictive ephemeris acquisition unit 51, a required location accuracy level setup unit 52, and a predictive ephemeris use control unit 53 function in the CPU 11; and a satellite search unit 54 and a positioning calculation unit 55 function in the GPS unit 16.

Further, a predictive ephemeris storage unit 71 is set up in an area of the storage unit 19.

The predictive ephemeris storage unit 71 stores the predictive ephemeris data acquired, as well as the date and time of acquiring the predictive ephemeris data from the predictive ephemeris server 100.

The predictive ephemeris acquisition unit 51 acquires predictive ephemeris data from an external server (in the present embodiment, the predictive ephemeris server 100) that manages predictive ephemeris data. In the present embodiment, predictive ephemeris data is acquired from the predictive ephemeris server 100 via the mobile terminal 2. The predictive ephemeris storage unit 71 stores the predictive ephemeris data acquired.

The required location accuracy level setup unit 52 sets up a required location accuracy level, for example, through a user operation via the input unit 17. In the present embodiment, for example, the required location accuracy level is set at any one of the following levels: the required location accuracy level [not restricted]; the required location accuracy level [permitted within 100 m]; the required location accuracy level [permitted within 50 m]; the required location accuracy level [permitted within 30 m]; or the required location accuracy level [not permitted within 30 m].

Further, the required location accuracy level setup unit 52 determines which one of the required location accuracy levels has been set.

The predictive ephemeris use control unit 53 controls the GPS unit 16 to switch the usage of predictive ephemeris data, based on the required location accuracy level that has been set, and the number of days elapsed after acquiring the predictive ephemeris data.

Here, explanations are provided for characteristics in relation to the number of days elapsed after acquiring predictive ephemeris data.

Figure 4:
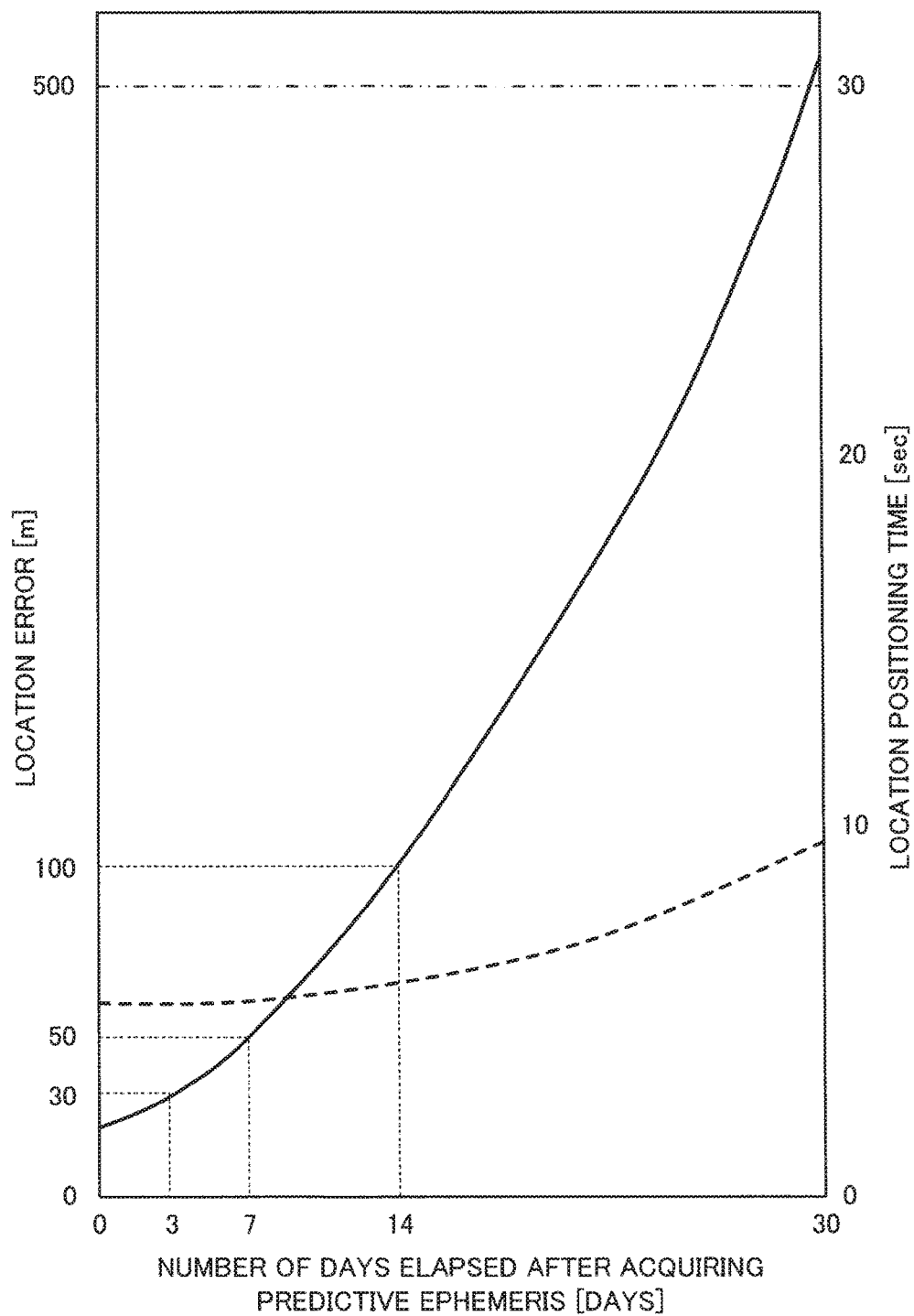
FIG. 4 is a graph illustrating a relationship between the number of days elapsed after acquiring predictive ephemeris data, and location errors as well as location positioning time.

FIG. 4 is a graph illustrating a relationship between the number of days elapsed after acquiring predictive ephemeris data, and location errors as well as location positioning time. Note that the lines in the graph represent the following relationships. The solid line represents a relationship between the number of days elapsed after acquiring predictive ephemeris data and the location errors; the dashed line represents a relationship between the number of days elapsed after acquiring predictive ephemeris data and the location positioning time; and the two-dot chain line represents a relationship between the number of days elapsed after acquisition and the location positioning time in the case in which predictive ephemeris data is not used.

As illustrated in FIG. 4, in terms of the relationship between the number of days elapsed after acquiring predictive ephemeris data and the location errors, the location errors increase as days elapse after acquiring the predictive ephemeris data. Namely, after acquiring the predictive ephemeris data, the location error is 30 m when three (3) days have elapsed, 50 m when seven (7) days have elapsed, and 100 m when fourteen (14) days have elapsed. The location error is 500 m when thirty (30) days have elapsed.

Further, in terms of the relationship between the number of days elapsed after acquiring predictive ephemeris data and the location positioning time, as the number of days elapsed after acquiring predictive ephemeris data increases, the location positioning time will become longer; however, in comparison to the absence of predictive ephemeris data, the positioning time will be shorter in the longer term, which achieves a time reduction effect.

As days elapse after acquiring the predictive ephemeris data, the predictive ephemeris data exhibits the characteristics as described above. Therefore, the logger apparatus 1 constantly uses predictive ephemeris data for a satellite search, since the satellite search time is shortened regardless of the number of days elapsed; and depending on the required location accuracy level, the logger apparatus 1 uses predictive ephemeris data for positioning calculation for a limited number of days elapsed.

Specifically, the predictive ephemeris use control unit 53 switches the usage of predictive ephemeris data as follows, depending on the characteristics of predictive ephemeris data as described above.

In the case in which the required location accuracy level is [not restricted], the expiration date of predictive ephemeris data is set to 30 days after acquiring the predictive ephemeris data, and until the 30th day, the predictive ephemeris data will be used for both of <satellite search by way of the satellite search unit 54> and <positioning calculation by way of the positioning calculation unit 55>.

In the case in which the required location accuracy level is [permitted within 100 m], predictive ephemeris data is used for both of <satellite search by way of the satellite search unit 54> and <positioning calculation by way of the positioning calculation unit 55> until the 14th day when the location errors will fall within 100 m; and predictive ephemeris data is only used for <satellite search by way of the satellite search unit 54> on and after the 15th day when the location errors will exceed 100 m.

In the case in which the required location accuracy level is [permitted within 50 m], predictive ephemeris data is used for both of <satellite search by way of the satellite search unit 54> and <positioning calculation by way of the positioning calculation unit 55> until the 7th day when the location errors will fall within 50 m; and predictive ephemeris data is only used for <satellite search by way of the satellite search unit 54> on and after the 8th day when the location errors will exceed 50 m.

In the case in which the required location accuracy level is [permitted within 30 m], predictive ephemeris data is used for both of <satellite search by way of the satellite search unit 54> and <positioning calculation by way of the positioning calculation unit 55> until the 3rd day when the location errors will fall within 30 m; and predictive ephemeris data is only used for <satellite search by way of the satellite search unit 54> on and after the 4th day when the location errors will exceed 30 m.

In the case in which the required location accuracy level is [not permitted within 30 m], since the location error minimization is a top priority, predictive ephemeris data is only used for <satellite search by way of the satellite search unit 54>.

Namely, the required location accuracy level represents a permissible range, in which the location information obtained by way of the logger apparatus 1 performing GPS positioning is allowed; and as the permissible range is narrower (or the required location accuracy level is higher), the number of days of using predictive ephemeris data for <positioning calculation by way of the positioning calculation unit 55> is set lower.

Figure 5:
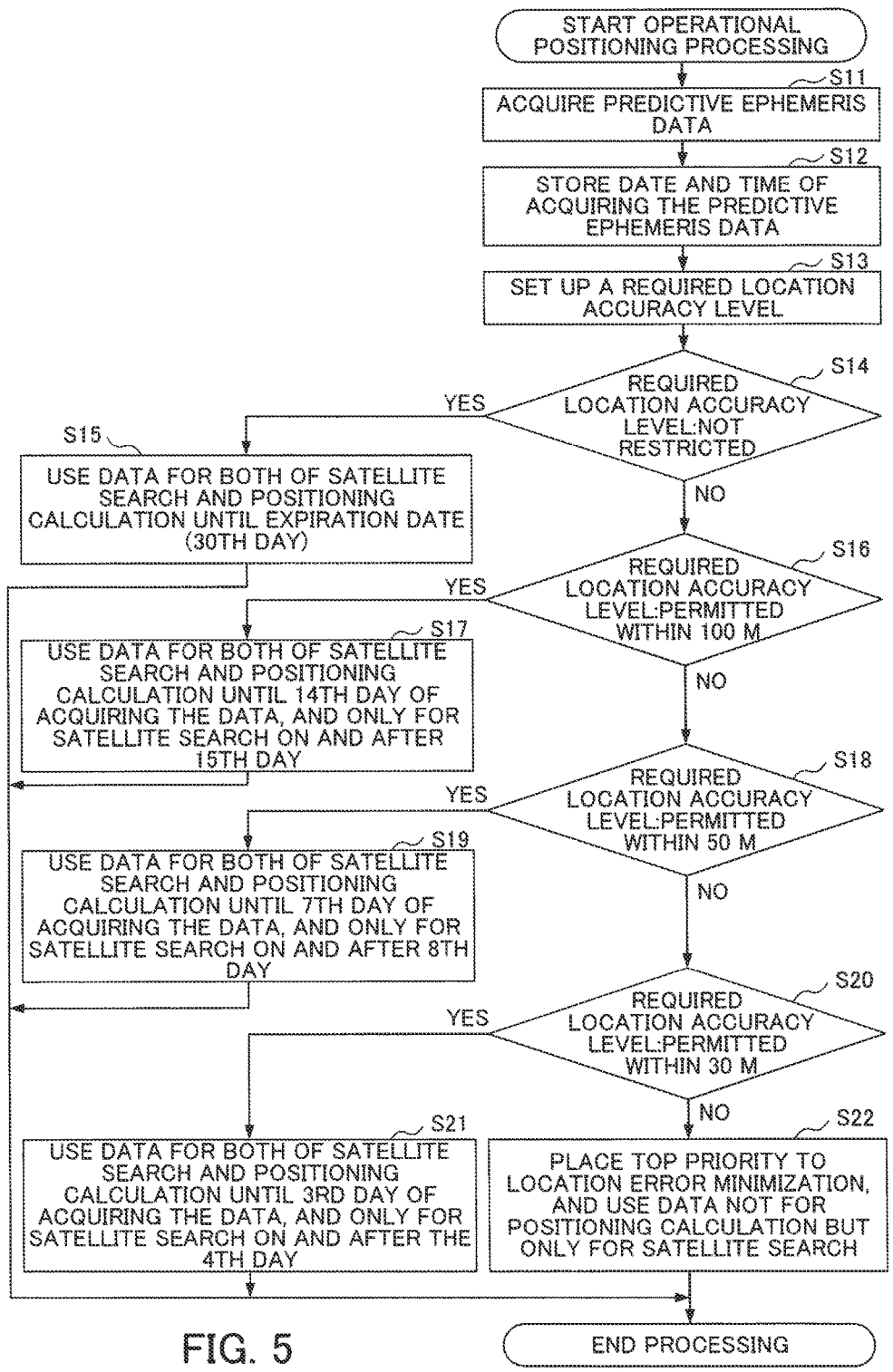
FIG. 5 is a flow diagram illustrating a flow of the operational positioning processing performed by the logger apparatus 1 of FIG. 2 having the functional configuration of FIG. 3.

FIG. 5 is a flow diagram illustrating a flow of the operational positioning processing performed by the logger apparatus 1 of FIG. 2 having the functional configuration of FIG. 3.

The operational positioning processing is started through a user operation on the input unit 17 to start the operational positioning processing. Prior to the processing, a special application for acquiring predictive ephemeris data is installed on the mobile terminal 2. The logger apparatus 1 will acquire predictive ephemeris data from the predictive ephemeris server 100 via the mobile terminal 2.

In Step S11, the predictive ephemeris acquisition unit 51 controls the communication unit 20 to acquire predictive ephemeris data managed in the predictive ephemeris server 100. In the present embodiment, by connecting the logger apparatus 1 and the mobile terminal 2, the predictive ephemeris data, which has been acquired in advance by the mobile terminal 2 from the predictive ephemeris server 100, is acquired. The predictive ephemeris storage unit 71 stores the predictive ephemeris data acquired.

In Step S12, the predictive ephemeris acquisition unit 51 stores, into the predictive ephemeris storage unit 71, the date and time of acquiring the predictive ephemeris data from the predictive ephemeris server 100.

In Step S13, the required location accuracy level setup unit 52 sets up a required location accuracy level, by way of, for example, a user setup operation on the input unit 17 in relation to the application of the logger apparatus 1. For example, the required location accuracy level is set at any one of the following five levels: the required location accuracy level [not restricted]; the required location accuracy level [permitted within 100 m]; the required location accuracy level [permitted within 50 m]; the required location accuracy level [permitted within 30 m]; or the required location accuracy level [not permitted within 30 m].

In Step S14, the required location accuracy level setup unit 52 determines whether the required location accuracy level is set at the level [not restricted].

In the case in which the required location accuracy level is set at a level other than [not restricted], the determination in Step S14 is NO, and the processing advances to Step S16.

In the case in which the required location accuracy level is set at the level [not restricted], the determination in Step S14 is YES, and the processing advances to Step S15.

In Step S15, the predictive ephemeris use control unit 53 performs an operation with the GPS unit 16 until the expiration date of predictive ephemeris data (in the present embodiment, until the 30th day), such that the predictive ephemeris data is used for both of satellite search and positioning calculation. Subsequently, the operational positioning processing ends.

In Step S16, the required location accuracy level setup unit 52 determines whether the required location accuracy level is set at the level [permitted within 100 m].

In the case in which the required location accuracy level is not set at the level [permitted within 100 m], the determination in Step S16 is NO, and the processing advances to Step S18.

In the case in which the required location accuracy level is set at the level [permitted within 100 m], the determination in Step S16 is YES, and the processing advances to Step S17.

In Step S17, the predictive ephemeris use control unit 53 performs an operation with the GPS unit 16, such that the predictive ephemeris data is used for both of satellite search and positioning calculation until the 14th day of acquiring the predictive ephemeris data, and the predictive ephemeris data is only used for satellite search on and after the 15th day. Subsequently, the operational positioning processing ends.

In Step S18, the required location accuracy level setup unit 52 determines whether the required location accuracy level is set at the level [permitted within 50 m].

In the case in which the required location accuracy level is not set at the level [permitted within 50 m], the determination in Step S18 is NO, and the processing advances to Step S20.

In the case in which the required location accuracy level is set at the level [permitted within 50 m], the determination in Step S18 is YES, and the processing advances to Step S19.

In Step S19, the predictive ephemeris use control unit 53 performs an operation with the GPS unit 16, such that the predictive ephemeris data is used for both of satellite search and positioning calculation until the 7th day of acquiring the predictive ephemeris data, and the predictive ephemeris data is only used for satellite search on and after the 8th day. Subsequently, the operational positioning processing ends.

In Step S20, the required location accuracy level setup unit 52 determines whether the required location accuracy level is set at the level [permitted within 30 m].

In the case in which the required location accuracy level is not set at the level [permitted within 30 m], namely, in the case in which the required location accuracy level is set at the level [not permitted within 30 m], the determination in Step S20 is NO, and the processing advances to Step S22.

In the case in which the required location accuracy level is set at the level [permitted within 30 m], the determination in Step S20 is YES, and the processing advances to Step S21.

In Step S21, the predictive ephemeris use control unit 53 performs an operation with the GPS unit 16, such that the predictive ephemeris data is used for both of satellite search and positioning calculation until the 3rd day of acquiring the predictive ephemeris data, and the predictive ephemeris data is only used for satellite search on and after the 4th day. Subsequently, the operational positioning processing ends.

In Step S22, the predictive ephemeris use control unit 53 performs an operation with the GPS unit 16, in which a top priority is placed on location error minimization, such that the predictive ephemeris data is not used for positioning calculation, but is only used for satellite search. Subsequently, the operational positioning processing ends.

Conventional technologies had problems, in the case without performing control, location errors will increase as days of using predictive ephemeris data elapse; and in the case of stopping using the predictive ephemeris data when days have elapsed at a certain location error level, the effect of shortening the satellite search time can no longer be achieved thereafter.

Accordingly, depending on the number of days elapsed after acquiring predictive ephemeris data, in accordance with the required location accuracy level, the logger apparatus 1 separately controls the two cases, in which predictive ephemeris data is only used for satellite search, or also used for positioning calculation; as a result. Therefore, the location error level will not exceed the required location error level, the satellite search time is shortened until the ephemeris expiration date, and the satellite search time can be reduced concurrently with preventing the location accuracy level from deteriorating.

It should be noted that the present invention is not to be limited to the above-mentioned embodiment, and that modifications, improvements, etc. within a scope that can achieve the objects of the present invention are also included in the present invention.

In the above-mentioned embodiment, in relation to the operational positioning processing, the processing flow based on the location error levels is divided into multiple levels (five levels); however, the processing flow can be set up in an arbitrary manner, and may be a no-level flow by use of a formula of a characteristic function or the like.

Further, in the above-mentioned embodiment, the present invention is configured as the logger apparatus 1; however, the present invention may be configured to control an external device having a function of the GPS unit 16.

Moreover, in the above-mentioned embodiment, the present invention is configured such that predictive ephemeris data, which is managed in the predictive ephemeris server 100 being an external server, is temporarily downloaded to the mobile terminal 2 (in the present embodiment, a PC or smartphone), and is transferred to the logger apparatus 1 via USB or communication such as wireless LAN/Bluetooth (registered trademark); however, the logger apparatus 1 may be configured to directly acquire predictive ephemeris data from the predictive ephemeris server 100.

In addition, in the above-mentioned embodiment, the present invention is configured such that the GPS unit 16 performs a satellite search, receives GPS signals by way of a GPS receiving antenna (not illustrated) from the plurality of GPS satellites searched by the satellite search, and performs positioning calculation, based on the GPS signals received; however, the CPU 11 may be configured to perform positioning calculation.

Further, in the above-mentioned embodiment, the present invention is configured such that predictive ephemeris data is used for both of <satellite search by way of the satellite search unit 54> and <positioning calculation by way of the positioning calculation unit 55>, or is only used for <satellite search by way of the satellite search unit 54>; however, another configuration may be added, such that predictive ephemeris data is not used for both of <satellite search by way of the satellite search unit 54> and <positioning calculation by way of the positioning calculation unit 55>. In this case, for example, in the case in which the number of days elapsed after acquiring predictive ephemeris data exceeds the expiration date, which has been set in the predictive ephemeris data, the predictive ephemeris data may not be used for both of <satellite search> and <positioning calculation>.

Moreover, in the above-mentioned embodiment, the present invention is configured such that the user sets up the required location accuracy level via the input unit 17; however, for example, the logger apparatus 1 may be provided with a camera function and a function to determine whether a scenery photographed with the camera function is a city or nature, and may be configured to automatically set up the required location accuracy level at a higher level if the scenery is determined to be a city, and set up the required location accuracy level at a lower level if the scenery is determined to be nature.

In the above-mentioned embodiment, a digital camera is described as an example of the logger apparatus 1 to which the present invention is applied; however, the present invention is not limited thereto, in particular.

For example, the present invention can be applied to any electronic device in general having an operational positioning processing function. More specifically, for example, the present invention can be applied to a laptop personal computer, a printer, a television receiver, a video camera, a portable navigation device, a cell phone device, a smartphone, a portable gaming device, and the like.

The processing sequence described above can be executed by way of hardware, and can be executed by way of software as well.

In other words, the hardware configurations of FIG. 3 are merely illustrative examples, and the present invention is not limited thereto, in particular. Namely, the types of functional blocks employed to realize the above-mentioned functions are not particularly limited to the examples illustrated in FIG. 3, so long as the logger apparatus 1 is provided with the functions enabling the above-mentioned processing sequence to be executed in its entirety.

A single functional block may be configured with a single piece of hardware, a single installation of software, or a combination thereof.

The functional configurations in the present embodiment are realized by way of a processor for performing arithmetic processing; and a processor usable for the present embodiment includes a processor configured with a single unit of various types of processing units, such as a single processor, a multiprocessor, and a multi-core processor, as well as a combination of such various types of processing units with processing circuits such as ASIC (Application Specific Integrated Circuit) or FPGA (Field-Programmable Gate Array).

In the case in which a sequence of processing is executed by way of software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program not only can be constituted by the removable medium 31 illustrated in FIG. 2 which is distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (registered trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded, or a hard disk, etc. included in the storage unit 19 of FIG. 2.

It should be noted that, in the present specification, the steps defining the program recorded in the storage medium include not only the processing executed in a time series following this order, but also processing executed in parallel or individually, which is not necessarily executed in a time series.

The embodiment of the present invention described above is only illustrative, and is not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A positioning control apparatus, comprising:
   a GPS unit that performs a satellite searching step of searching for a GPS satellite and a positioning calculating step of performing a positioning calculation by use of a GPS signal received from the GPS satellite searched for in the satellite searching step;
   an acquisition unit that acquires predictive ephemeris data from outside of the positioning control apparatus;
   a setup unit that sets up, based on a required location accuracy level required for location information calculated by way of the positioning control apparatus, a switching condition such that the predictive ephemeris data is i) used for both the satellite searching step and the positioning calculating step, or ii) used for the satellite searching step only among the satellite searching step and the positioning calculating step; and
   a control unit that switches, based on the switching condition that has been set up by way of the setup unit, the predictive ephemeris data to be i) used for both the satellite searching step and the positioning calculating step, or ii) used for the satellite searching step only among the satellite searching step and the positioning calculating step.

2. The positioning control apparatus according to claim 1, wherein
   a user of the positioning control apparatus sets up the switching condition by way of the setup unit.

3. The positioning control apparatus according to claim 1, wherein
   in a case in which the required location accuracy level is set up such that a location accuracy level is not restricted, the setup unit sets up the switching condition such that the predictive ephemeris data is used for the positioning calculation.

4. The positioning control apparatus according to claim 1, wherein
   a number of days is set up in relation to the required location accuracy level; and
   the setup unit sets up, based on whether a number of days elapsed after acquiring the predictive ephemeris data is within the number of days being set up in relation to the required location accuracy level, a switching condition as to whether the predictive ephemeris data should be used for the positioning calculation.

5. The positioning control apparatus according to claim 4, wherein
   in a case in which the number of days elapsed after acquiring the predictive ephemeris data is within the number of days being set up in relation to the required location accuracy level, the setup unit sets up the switching condition such that the predictive ephemeris data is used for the positioning calculation.

6. The positioning control apparatus according to claim 4, wherein the number of days is set up in relation to the required location accuracy level, such that the higher the required location accuracy is, the lower the number of days is.

7. The positioning control apparatus according to claim 1, wherein a number of days is set up in relation to the required location accuracy level; and in a case in which the number of days elapsed after acquiring the predictive ephemeris data exceeds the number of days being set up in relation to the required location accuracy level, the setup unit sets up the switching condition such that the predictive ephemeris data is only used for the satellite searching step.

8. The positioning control apparatus according to claim 1, wherein in a case in which the required location accuracy level is higher than a predetermined accuracy level, the setup unit sets up the switching condition such that the predictive ephemeris data is only used for the satellite searching step.

9. The positioning control apparatus according to claim 1, wherein in a case in which the number of days elapsed after acquiring the predictive ephemeris data exceeds the expiration date, the setup unit further sets up the switching condition such that the predictive ephemeris data is not used for the positioning calculation.

10. A positioning control method, comprising:

a satellite searching step of searching for a GPS satellite;

a position calculating step of performing a positioning calculation by use of a GPS signal received from the GPS satellite searched for in the satellite searching step;

an acquiring step of acquiring predictive ephemeris data from outside of a positioning control apparatus;

a setting-up step of setting up, based on a required location accuracy level required for location information calculated by way of the positioning control apparatus, a switching condition such that the predictive ephemeris data is i) used for both the satellite searching step and the positioning calculating step, or ii) used for the satellite searching step only among the satellite searching step and the positioning calculating step; and a controlling step of switching, based on the switching condition that has been set up in the setting-up step, the predictive ephemeris data to be i) used for both the satellite searching step and the positioning calculating step, or ii) used for the satellite searching step only among the satellite searching step and the positioning calculating step.

11. A non-transitory computer-readable medium having a program recorded thereon for causing a computer for controlling a positioning control apparatus to execute the processing of:

searching for a GPS satellite;

performing a positioning calculation by use of a GPS signal received from the GPS satellite;

acquiring predictive ephemeris data from outside of the positioning control apparatus;

setting up, based on a required location accuracy level required for location information calculated by way of the positioning control apparatus, a switching condition such that the predictive ephemeris data is i) used for both the satellite searching step and the positioning calculating step, or ii) used for the satellite searching step only among the satellite searching step and the positioning calculating step; and switching, based on the switching condition that has been set up, the predictive ephemeris data to be i) used for both the satellite searching step and the positioning calculating step, or ii) used for the satellite searching step only among the satellite searching step and the positioning calculating step.

* * * * *